United States Patent
Kikuchi et al.

(10) Patent No.: US 8,903,835 B2
(45) Date of Patent: Dec. 2, 2014

(54) INFORMATION DEVICE AND INFORMATION PRESENTATION METHOD FOR SELECTED OBJECT INFORMATION CORRESPONDING TO DEVICE LOCATION

(75) Inventors: Masaaki Kikuchi, Fuchu (JP); Hideo Umeki, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 734 days.

(21) Appl. No.: 12/410,038

(22) Filed: Mar. 24, 2009

(65) Prior Publication Data

US 2009/0248679 A1    Oct. 1, 2009

(30) Foreign Application Priority Data

Mar. 28, 2008   (JP) .................................. 2008-086153

(51) Int. Cl.
*G06F 17/30*    (2006.01)

(52) U.S. Cl.
CPC ........ *G06F 17/3087* (2013.01); *G06F 17/3097* (2013.01)
USPC .......................................................... 707/749

(58) Field of Classification Search
USPC .................... 715/259, 260; 707/999.005, 749
See application file for complete search history.

(56) References Cited

U.S. PATENT DOCUMENTS

| | | | |
|---|---|---|---|
| 6,792,421 B2 * | 9/2004 | Wyse ..................................... | 1/1 |
| 7,085,818 B2 * | 8/2006 | Brown et al. ................. | 709/217 |
| 7,743,081 B2 * | 6/2010 | Roberts ......................... | 707/821 |
| 7,873,356 B2 * | 1/2011 | Flynt et al. .................... | 455/418 |
| 2007/0288433 A1 * | 12/2007 | Gupta et al. ...................... | 707/3 |

FOREIGN PATENT DOCUMENTS

| | | |
|---|---|---|
| JP | 2002-324075 A | 11/2002 |
| JP | 2003-303186 | 10/2003 |
| JP | 2004-153398 | 5/2004 |
| JP | 2004-287850 A | 10/2004 |
| JP | 2006-350904 | 12/2006 |

OTHER PUBLICATIONS

Setten et al., "Context-Aware Recommendations in the Mobile Tourist Applciation COMPASS", 2004, Springer-Verlag Berlin Heidelberg, pp. 235-244.*
Yu et al., "Matching User's Semantics with Data Semantics in Location-Based Services", 2005, ACM, pp. 1-6.*
Japanese Office Action dated Sep. 25, 2012 from corresponding JP Patent Appln. No. 2008-086153, 5 pages.

* cited by examiner

*Primary Examiner* — Rehana Perveen
*Assistant Examiner* — Hung Havan
(74) *Attorney, Agent, or Firm* — Ohlandt, Greeley, Ruggiero & Perle, L.L.P.

(57) ABSTRACT

An information device is provided that includes a first acquisition unit, a second acquisition unit, a search unit, a first display unit, a determining unit, and a second display unit. The first acquisition unit acquires situation data indicating a situation of the information device. The second acquisition unit acquires object information in accordance with the situation data. The search unit searches a database for related words related to the object information. The first display unit displays the related words to allow any one of the related words to be selected, while the determining unit determines whether any one of the related words is selected. The second display unit displays the object information acquired by the second acquisition unit for the selected related words.

14 Claims, 11 Drawing Sheets

| Name | Reading | Type | Position information |
|---|---|---|---|
| Cafe Paris | Cafe Paris | Tea house | +35.3608+138.7275 |
| Japanese restaurant Yoshida | Japanese restaurant Yoshida | Restaurant | +35.3605+138.7266 |
| Tea House Midori | Tea House Midori | Tea house | +35.3601+138.7271 |
| Higashi-Ginza | Higashi-Ginza | Station | +35.3605+138.7272 |
| Ginza | Ginza | Station | +35.3608+138.7279 |
| Bar 4-chome | Bar 4-chome | Restaurant | +35.3607+138.7280 |
| Yamada Hotel | Yamada Hotel | Hotel | +35.3608+138.7281 |
| Restaurant Izumi | Restaurant Izumi | Restaurant | +35.3601+138.7282 |
| Midorikawa Restaurant | Midorikawa Restaurant | Restaurant | +35.3608+138.7283 |
| Ginza 1-chome | Ginza 1-chome | Station | +35.3611+138.7284 |
| Yurakucho | Yurakucho | Station | +35.3606+138.7285 |
| Yuhi Bookstore | Yuhi Bookstore | Bookstore | +35.3603+138.7271 |
| ... | | | |

310 Neighboring object information

FIG. 4B

| Type | Related word |
|---|---|
| Tea house | Drink (tea), rest |
| Restaurant | Eat, drink (alcohol) |
| Station | Return, go |
| Hotel | Put up |
| Book store | Check, buy |
| ... | |

320 Object type related word DB

330 — Situation adaptability table

| Situation/related word | Return | Eat | Drink (tea) | Drink (alcohol) | Rest | Go | Put up | ... |
|---|---|---|---|---|---|---|---|---|
| My house/morning | 0 | 20 | 10 | 10 | 0 | 80 | 10 | |
| My house/afternoon | 0 | 40 | 40 | 40 | 10 | 60 | 20 | |
| Down town/evening | 20 | 80 | 10 | 70 | 40 | 30 | 20 | |
| Down town/night | 70 | 40 | 20 | 80 | 20 | 20 | 60 | |
| ... | | | | | | | | |

F I G. 4C

340 — Synonym dictionary

| Specific expression | Related word |
|---|---|
| Return | Return |
| Return home | Return |
| Eat | Eat |
| Meal | Eat |
| Hungry | Eat |
| Drink (tea) | Drink (tea) |
| Drink tea | Drink (tea) |
| Thirsty | Drink (tea) |
| Drink (alcohol) | Drink (alcohol) |
| Alcohol party | Drink (alcohol) |
| Rest | Rest |
| Rest | Rest |
| Tired | Rest |
| Go | Go |
| Proceed | Go |
| Leave | Go |
| Put up | Put up |
| Hotel | Put up |
| ... | |

INFORMATION DEVICE AND INFORMATION PRESENTATION METHOD FOR SELECTED OBJECT INFORMATION CORRESPONDING TO DEVICE LOCATION

CROSS-REFERENCE TO RELATED APPLICATIONS

This application is based upon and claims the benefit of priority from prior Japanese Patent Application No. 2008-086153, filed Mar. 28, 2008, the entire contents of which are incorporated herein by reference.

BACKGROUND OF THE INVENTION

1. Field of the Invention

The present invention relates to an information device and an information presentation method for presenting an input character string candidate corresponding to a situation in which the information device is located.

2. Description of the Related Art

With regard to a mobile phone or an information device such as a mobile PC or PDA connectable to a network such as LAN and having a character input function, many functions for supporting a user in the information input have been proposed in the past. The conventional character input operation method has been proposed, for example, in which the information such as the name of a place or an event is acquired from a regional information server based on the information device position information obtained from GPS and presented in priority to the other wording as a predicted character conversion candidate corresponding to the partial character string input by the user thereby to reduce the labor of inputting the character string related to the particular place or region (see JP-A 2003-303186 (KOKAI)).

Assume, for example, that the position information shows that the information device user is currently located in Suwa area. In the case where the user inputs the character "Su", the character string candidate "Suwa-ko (Lake Suwa)" contained in the regional dictionary data is presented to the user in high priority order. The methods are proposed and known in which a character string tied to the position information is presented as a candidate based on the frequency of use and access. In one method (see JP-A 2004-153398 (KOKAI)), unlike in JP-A 2003-303186 (KOKAI), for example, the region is not fixed, but in a way adapted to the user, an inquiry is given to the information server based on the position information of the information device and the input candidate information arranged in the order of access frequency is selected from the character input information data recorded in correspondence with the position information and presented to the information device. In another method (see JP-A 2006-350904 (KOKAI)), the character input conversion dictionary is switched in accordance with the position of the information device and the input frequency is counted for each position, thereby providing the character conversion information adapted for the scene of use.

The techniques disclosed in JP-A 2003-303186 (KOKAI) and JP-A 2006-350904 (KOKAI), however, are typically based on the assumption that the user memorizes the name of the region or the event (though a part of the character string), as the case may be, from the leading character string. Specifically, as long as the user has no knowledge of the character string which can be a clue, the intended character string becomes more difficult to specify. In the general practice of character string input, the efficiency of the character string input operation as a whole may be adversely affected by the constant appearance of the character string related to the position information in a high priority order of candidacy. Further, according to the techniques disclosed in JP-A 2004-153398 (KOKAI) and JP-A 2006-350904 (KOKAI), the input character candidate corresponding to the past frequency of input or access for each region can be presented. The use of the frequency information, however, makes it difficult for the initial user in a given region to enjoy the advantage of the particular technique.

BRIEF SUMMARY OF THE INVENTION

According to one aspect of the present invention, there is provided an information device, comprising: a first acquisition unit which acquires situation data indicating a situation of the device; a second acquisition unit which acquires a plurality of object information in accordance with the situation data; a search unit which searches a database for a plurality of related words related to the object information; a first display unit which displays the related words to allow any one of the related words to be selected; a determining unit which determines whether any one of the related words is selected; and a second display unit which displays the object information acquired by the second acquisition unit for the selected one of the related words which is determined by the determining unit.

BRIEF DESCRIPTION OF THE SEVERAL VIEWS OF THE DRAWING

FIG. 11, which is divided into FIGS. 11A and 11B, combine to form a flowchart showing a part of the processing steps in the configuration of collaboration between the information device and the information providing server;

DETAILED DESCRIPTION OF THE INVENTION

Embodiments of the invention will be described below with reference to the accompanying drawings.

Figure 1:
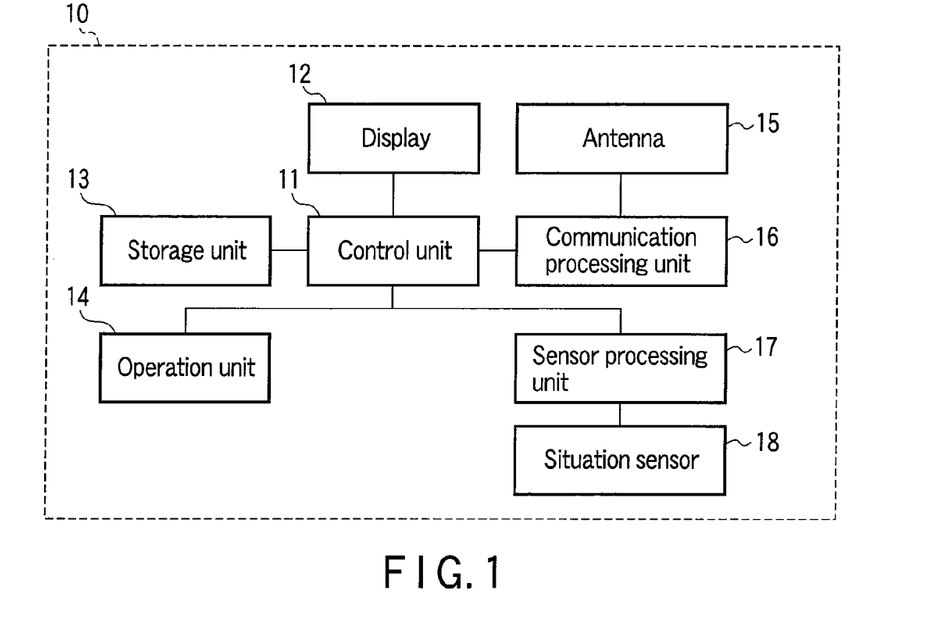
FIG. 1 is a block diagram showing a hardware configuration of an information device according to an embodiment.

As shown in FIG. 1, an information device 10 includes a control unit 11, a display unit 12, a storage unit 13, an operation unit 14, an antenna 15, a communication control unit 16, a sensor processing unit 17 and a situation sensor 18. According to this embodiment, the information device 10 is assumed to be a portable information device having the character input function and, while carrying, capable of acquiring the information from a network connected thereto. Nevertheless, the invention is applicable also to various non-portable information devices (such as the car navigation system) with equal effect. The control unit 11 is connected to the storage unit 13, the display unit 12, the communication processing unit 16, the sensor processing unit 17 and the operation unit 14 and has a CPU (central processing unit) to control the information device 10 as a whole. The display unit 12 is, for example, an information display unit configured of a liquid crystal display, through which the character, etc. is input and the converted character string and information are displayed. The storage unit 13 is configured of, for example, a flash memory to accumulate the position information such as longitude and latitude and information including names of shops and facilities and events with attribute information such as genre and open time. Also, the various dictionary information such as the input character string conversion dictionary and the synonym dictionary are stored. Through the operation unit 14, like the keyboard, for example, the characters and commands can be input. The communication processing unit 16 is connected to the antenna 15 to control the radio communication with external devices including the internet connection.

The situation sensor 18 acquires the sensor data usable for detection of the situation and environmental information to which the information device 10 is exposed. The sensor data obtained by the situation sensor 18 is processed in the sensor processing unit 17 thereby to recognize the prevailing situation. Examples of the situation sensor 18 include a GPS (global positioning system) receiver, a radio base station ID/radio reception intensity detection unit of a radio LAN (local area network), an acceleration sensor and a luminance sensor. The sensor processing unit 17 generates the position information of the information device 10 mainly by GPS or the radio LAN information.

Figure 2:
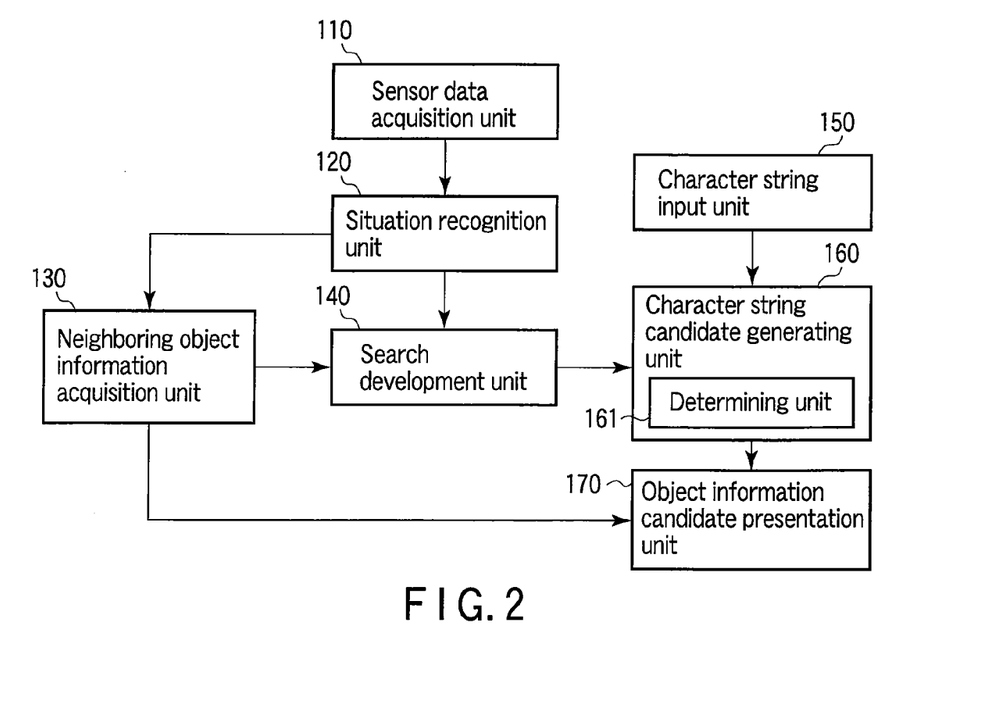
FIG. 2 is a block diagram showing a configuration for realizing the functions of the information device.

As shown in FIG. 2, the information device 10, as a configuration for realizing the various functions of this embodiment with the hardware configuration shown in FIG. 1, includes a sensor data acquisition unit 110, a situation recognition unit 120, a neighboring object information acquisition unit 130, a search unit 140, a character string input unit 150, a character string candidate generating unit 160 and an object information candidate presentation unit 170.

The sensor data acquisition unit 110 is included in the situation sensor 18, and the situation recognition unit 120 in the sensor processing unit 17. The character string input unit 150 is included in the operation unit 14. The neighboring object information acquisition unit 130 and the search unit 140 are included in the control unit 11 and the storage unit 13. Also, the character string candidate generating unit 160 and the object information candidate presentation unit 170 are included in the control unit 11, the display unit 12 and the storage unit 13.

The sensor processing unit 17 (the sensor data acquisition unit 110) acquires the GPS position information including the latitude and longitude and the time information, while the situation recognition unit 120 generates the data indicating, for example, the situation "weekday evening (17:41), Ginza area".

The "situation" is specifically defined as the "context". As described in reference 1 "Dey, A. K. and Abowd, G. D. (1999). Toward a better understanding of context and context-awareness. GVU Technical Report GIT-GVU-99-22, College of Computing, Georgia Institute of Technology", the "context" is all the information available to characterize the situation of an entity. The "entity" is a person, a place or an object considered related to the interaction between the user and the application, or the very object, user or application. Also, as described in reference 2 "Context-Aware Applications Survey www.hut.fi/~mkorkeaa/doc/context-aware.html", most information available for use at the time of interaction can be considered the context information. Examples are the personality, spatial information (ex: place, direction, speed, acceleration), time information (ex: time, year/month/date, season), environmental information (ex: temperature, atmospheric environment, light and noise level), social life situation (ex: with or near whom one exists), nearby resources (ex: accessible device, host), and resource availability (ex: battery, display, network, frequency band), physical information (ex: blood pressure, pulsation, respiration rate, muscular motion, voice tone) and action (ex: speaking, reading, walking, running).

In a specific case where the acceleration sensor is used as the situation sensor 18 and the sensor value output from the acceleration sensor is acquired by the sensor processing unit 17 (the sensor data acquisition unit 110), therefore, the situation recognition unit 120 recognizes the user behavior such as "walking", "running", "present in the train or tram car" from the transition pattern of the sensor value from the acceleration sensor.

In another specific case in which the temperature sensor is used as the situation sensor 18, the temperature condition such "hot" or "cold" is recognized. In a specific case using the barometer as the situation sensor 18, the situation recognition unit 120 recognizes the weather condition such as "fine" or "rainy". Incidentally, the situation sensor 18 is not limited to the hardware such as the sensor device. In place of the barometer used as the situation sensor 18, for example, the sensor data acquisition unit 110 may acquire the weather information from the internet or the like.

Also, the schedule information input by the user may be acquired by the sensor data acquisition unit 110 from the local storage unit or the internet and the schedule of the user may be recognized by the situation recognition unit 120. Also, in the case where the application software under execution in the information device 10 can communicate with the sensor data acquisition unit 110, the sensor data acquisition unit 110 may acquire various information in real time from the particular application software and can thus recognize the destination situation from, for example, a navigation application.

As described above, in accordance with the sensor or information used, the situation in which the device is located is recognized by the situation recognition unit 120. Incidentally, the situation sensor 18 may of course have plural sensors of the same or different types which can recognize the situation of a wide area with high accuracy. The process of weighting the related word in accordance with the adaptability between the related word and the situation described later is related to the information indicating the situation in which the device is located. As long as the situation can be recognized from a greater number of viewpoints, for example, the weight value can be added (or subtracted) for the related word appropriately in accordance with such a situation.

Now, the processing steps of the information device according to this embodiment will be explained below with reference to the flowchart of FIG. 3.

First, the object information acquisition unit 130 acquires the neighboring object information available for use in the prevailing situation in step S201. For example, neighboring object information 310 having the data structure shown in FIG. 4A is stored in the storage unit 13. The neighboring object information 310 includes the name, type and position information of the object. More specifically, the neighboring object information 310 is meta data associated with the object. In the situation "Ginza area", for example, the object data with the position information in the Ginza area is acquired. In this way, the neighboring object information acquired corresponds to some situation data.

The neighboring object information may be preset in the storage unit 13 at the time of shipment of the information device 10 or the new neighboring object information may be added, for example, by downloading from the network by the user manually or through the periodic automatic process. Also, as described later with reference to FIG. 11, the neighboring object information, instead of being held in the information device 10, may be arranged on the server communicable with the information device 10 to acquire the required information from the server. Further, the neighboring object information is not necessarily the information available in the neighborhood of the physical position of the user.

Figure 4A:
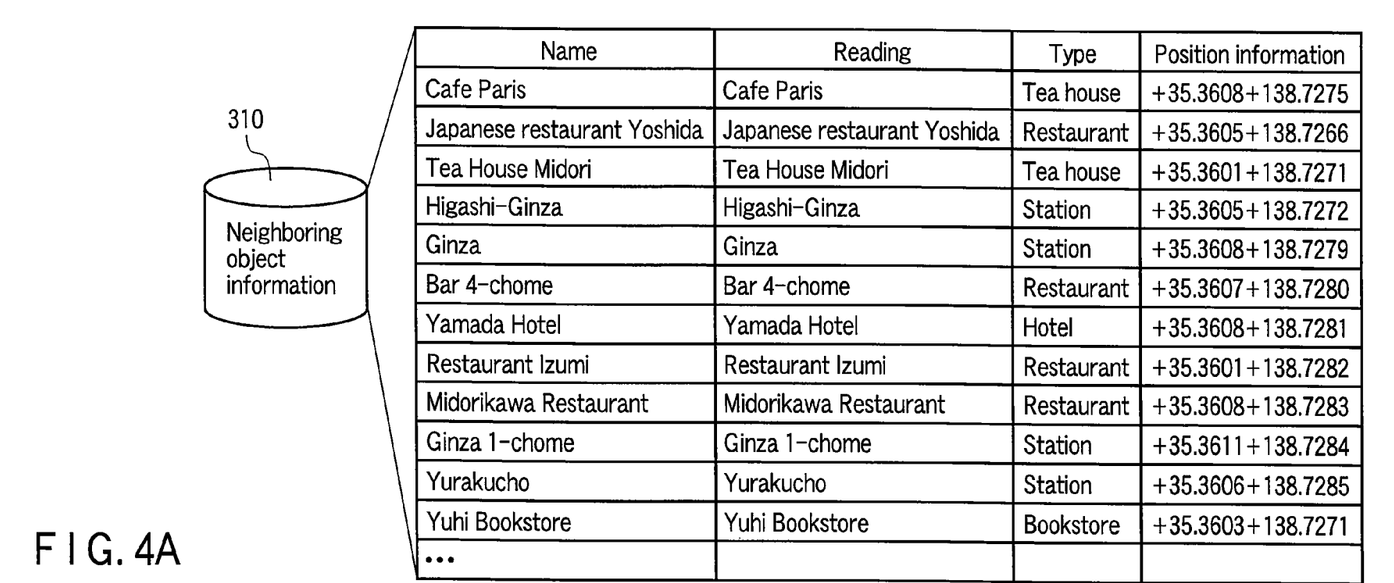
FIG. 4A shows the data structure of neighboring object information.
Figure 4B:
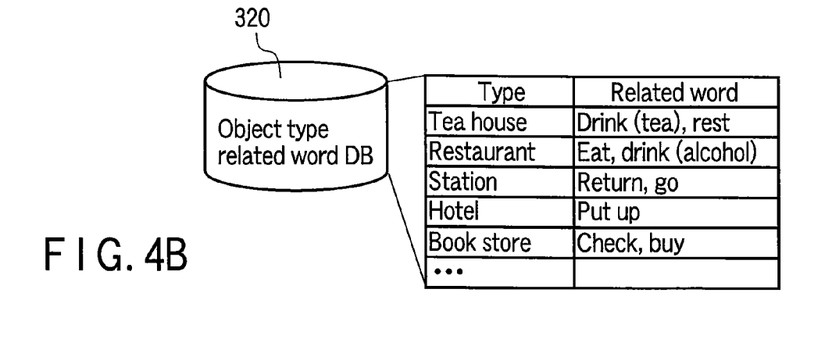
FIG. 4B the data structure of an object type related word DB.

In step S202, the related word is developed from the neighboring object information obtained. The development of the related word uses an object type related word database (DB). The storage unit 13 stores an object type related word database (DB) 320 having the data structure, for example, shown in FIG. 4B. The object type related word database (DB) 320 stores the related words for each type of the various object information. The type of the object information such as "tea house" is related to "drink" or "rest" as the related word.

Figure 4C:
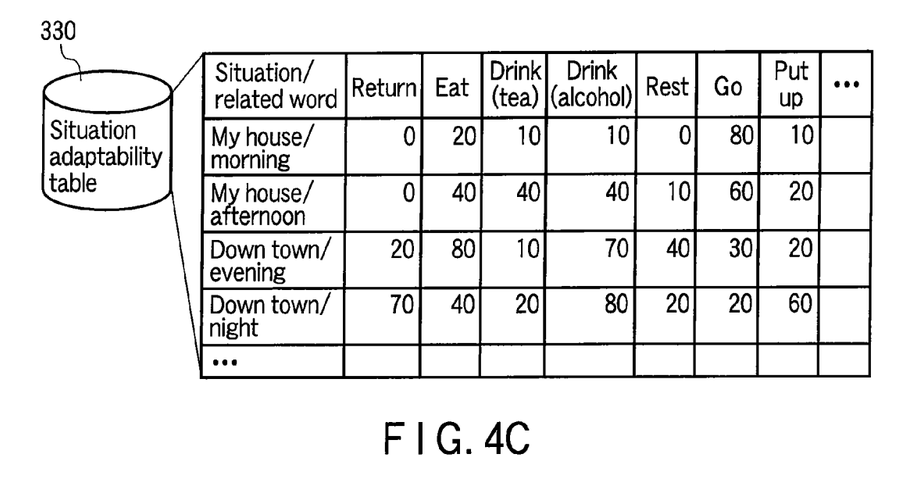
FIG. 4C the data structure of a situation adaptability table.

In step S203, each of the plural related words developed in step S202 is weighted in accordance with the situation adaptability. Some of the plural related words thus ordered based on this weighting process are used as "the initial character string candidate" before the character string is input by the user. As for the situation adaptability, a situation adaptability table 330 having the data structure as shown in FIG. 4C is stored in the storage unit 13. The situation adaptability table 330 indicates, in a numerical value, for example, the degree of situation adaptability between the situation information indicating the situation recognized by the situation recognition unit 120 and one or plural related words stored in the object type related word DB 320. With regard to the word related to a situation "my house/morning", for example, the related word "go" (situation adaptability: 80) has a comparatively high numerical value of the situation adaptability. This indicates that the related word "go" is strongly adapted to the situation "my house/morning" as compared with other related words and considered as the word often associated by the user in the particular situation.

Figure 5:
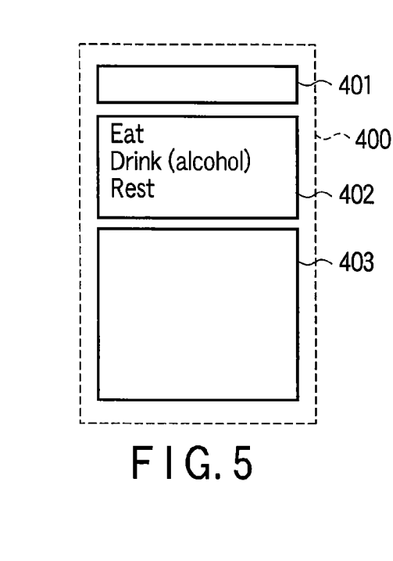
FIG. 5 is a diagram showing a terminal display screen.

In step S204, the initial character string candidate obtained in step S203 is displayed on the display unit 12. As shown in FIG. 5, for example, the initial character string candidate is displayed on a character string candidate display section 402 of a terminal display screen 400.

For example, the words "eat", "drink (alcohol)" and "rest" are displayed in that order as the initial character string candidate in the character string candidate display section 402. As described above, these are plural related words developed using the object type related word DB 320 for the neighboring object information 310 available for use as of the present time. Of all the plural related words weighted by the situation adaptability table 330, the top three related words, for example, are displayed as the initial character string candidate.

Assume that the situation "weekday evening (17:41), Ginza area" is recognized. In this situation, the related words "eat", "drink (alcohol)" and "rest" are considered to have the descending order of possibility used as the initial character string candidate (and further, as a clue word used to search for the object information).

In step S205, a determining unit 161 in the character string candidate generating unit 160, for example, judges which one of the plural character string candidates displayed on the character string candidate display section 402 has been selected. The character string candidates include the initial character string candidate displayed in step S204 and the character string candidate given in subsequent step S207. Once the determining unit 161 judges that one of the character string candidates is selected, the control proceeds to step S208. The user can input the character (or the character string) in the character input section 401 of the terminal display screen 400 shown in FIG. 5 with no character string candidate selected. The input character is detected and the character code acquired from the operation unit 14 by the character string input unit 150. Once the user inputs some character in the character input section 401 through the operation unit 14, the character string input unit 150 detects the input operation (step S206). Next, the character string candidate generating unit 160 generates a new character string candidate based on the input character (or character string) using the synonym dictionary (step S207), and then the control returns to step S204. This new character string candidate is displayed in step S204 in place of the initial character string candidate before the character string is input.

The process of step S207 to generate the new character string candidate will be explained below.

Figure 4D:
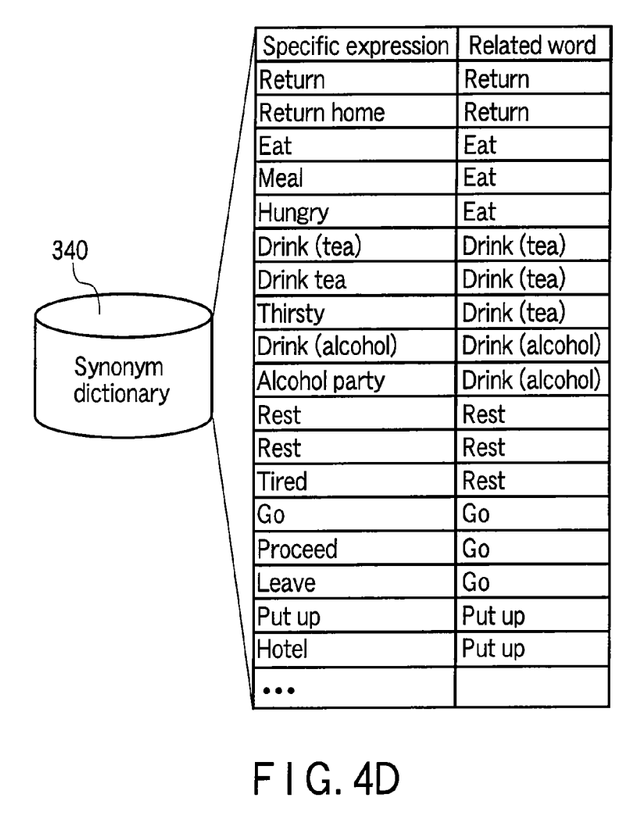
FIG. 4D the data structure of a synonym dictionary.

A synonym dictionary 340 having the data structure as shown in FIG. 4D is stored in the storage unit 13. The synonym dictionary 340 collects the specific expressions formed of the character string or the like related to the related words. The specific expression and the related word are mutually in the relation as synonyms.

Figure 6:
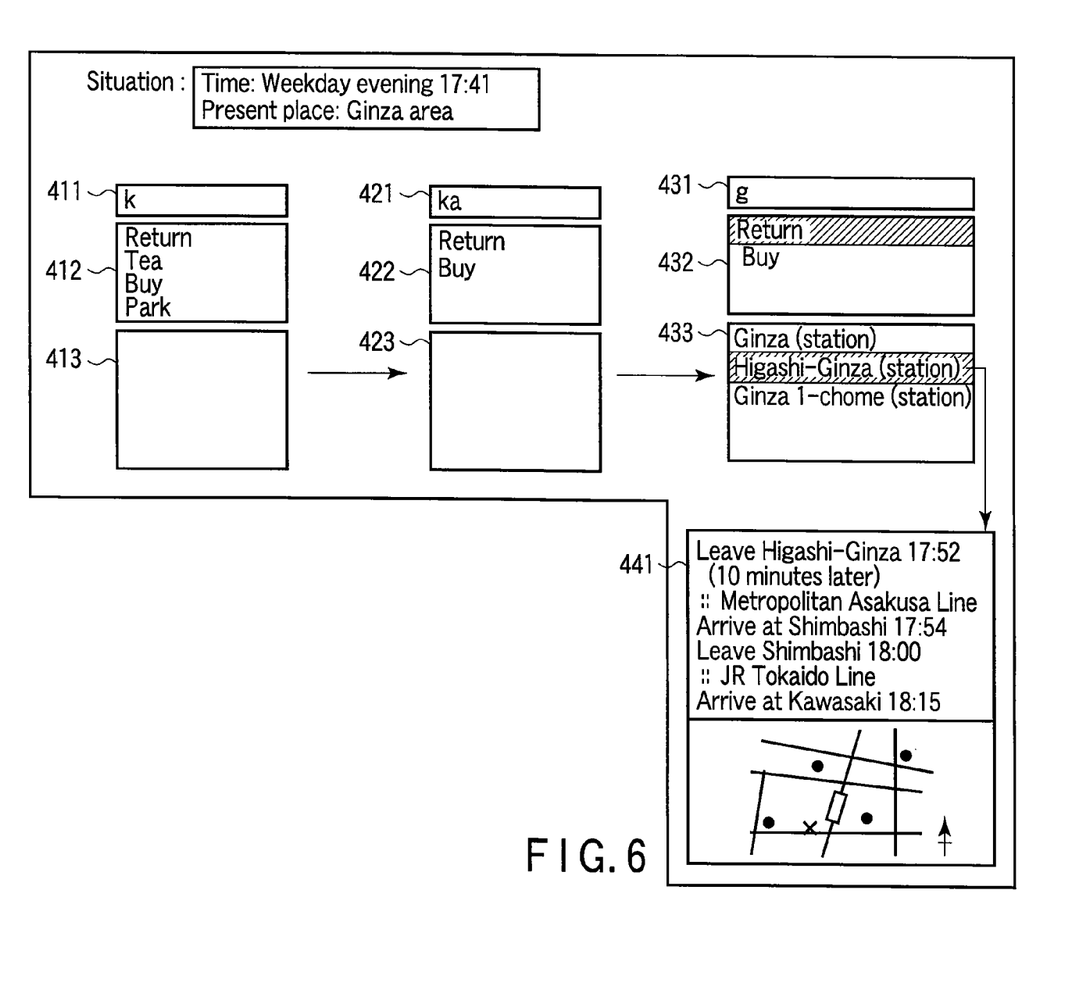
FIG. 6 is a diagram showing an example of a Roman character input method.

Assume, for example, that as indicated by reference numeral 411 in FIG. 6, only "k" is input in the character input section 401 by the Roman letter input method. With regard to the Roman letter "k", the related words corresponding to plural specific expressions with any one of Japanese letters of "ka" group ("ka", "ki", "ku", "ke", "ko") as a first reading character are extracted from the synonym dictionary 340, and as indicated by reference numeral 412, displayed as a new character string candidate. Then, assume that "ka" is input as indicated by reference numeral 421. The related words corresponding to plural specific expressions with Japanese "ka" as a first reading character are extracted from the synonym dictionary 340 and displayed as a new character string candidate as indicated by reference numeral 422. Incidentally, the character string candidates presented in accordance with the character input are desirably displayed in order of the degree of analogy with the input character string. Specifically, the degree of analogy between the input character string and each specific expression in the synonym dictionary 340 is calculated, and the corresponding related word (character string candidate) is weighted in accordance with the calculated degree of analogy. Then, the character string candidate is selected in descending order of the weight value.

Once the character string candidate "return" is selected as designated by reference numeral 432 in FIG. 6 (YES in step S205), the identification information (for example, the character string corresponding to a particular name) of several neighboring object information connected with the related word corresponding to the selected character string candidate is displayed in the related information presentation section 403 by the object candidate presentation unit 170 as indicated by reference numeral 433 (step S208). As a result, the user can access, for example, the desired information (neighboring object information) "Higashi-Ginza (station)". Specifically, once the user selects "Higashi-Ginza (station)" as the information to identify the neighboring object information, the related information presentation section 403 searches the internet by generating the search word from the current time and his/her house information in record and thus displays a return tram transfer guide 441.

Figure 7:
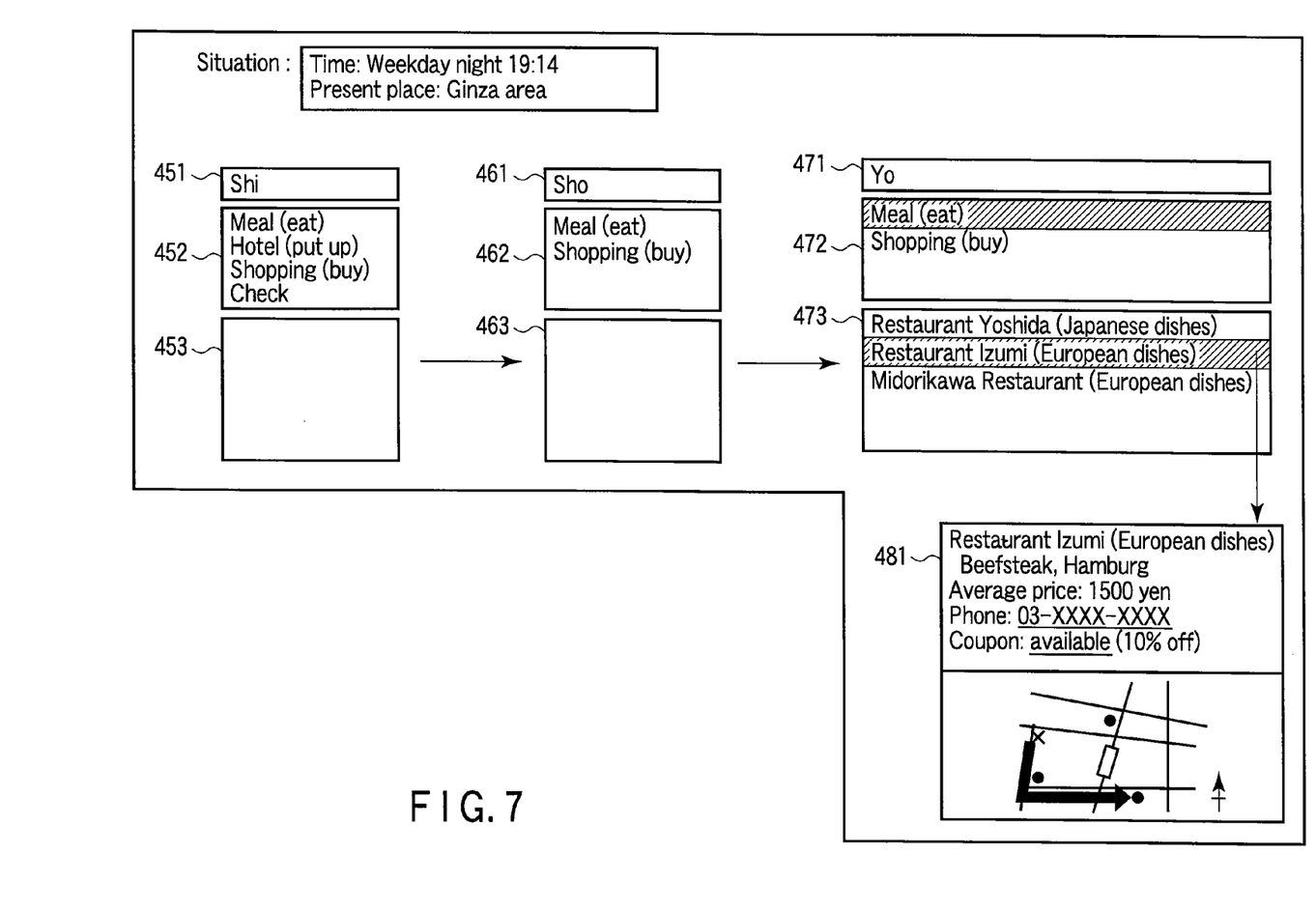
FIG. 7 is a diagram showing an example of a Japanese "kana" letter input method.

Instead of the Roman letter input as described above, the Japanese kana may be input as another character input method. This method will be explained with reference to FIG. 7. As indicated by reference numeral 451 in FIG. 7, for example, assume that the Japanese letter "si" is input in the character input section 401 according to the Japanese kana input scheme. The related words corresponding to plural specific expressions with the kana letter "si" as the first reading character are extracted from the synonym dictionary 340, so that "meal (siyokuji)", "hotel (siyukuhaku)", "shopping (siyoppingu)" and "check (siraberu)" are displayed in the character string candidate display section 402 as a new character string candidate as indicated by reference numeral 452. These related words indicate that the utility thereof is high in that order in the Ginza area in the weekday evening. In the case where the "meal (eat)" is selected from the plural character string candidates displayed as indicated by reference numeral 472, for example, the names of several restaurants are displayed as the information to identify the neighboring object information in the related information presentation section 403 as indicated by reference numeral 473 as neighboring objects connected with "meal". The user can select any of these plural restaurants. FIG. 7 shows an example of the process of starting the internet search and the pedestrian navigation application, displaying the detailed restaurant information and conducting the navigation 481 to the intended restaurant.

Figure 8:
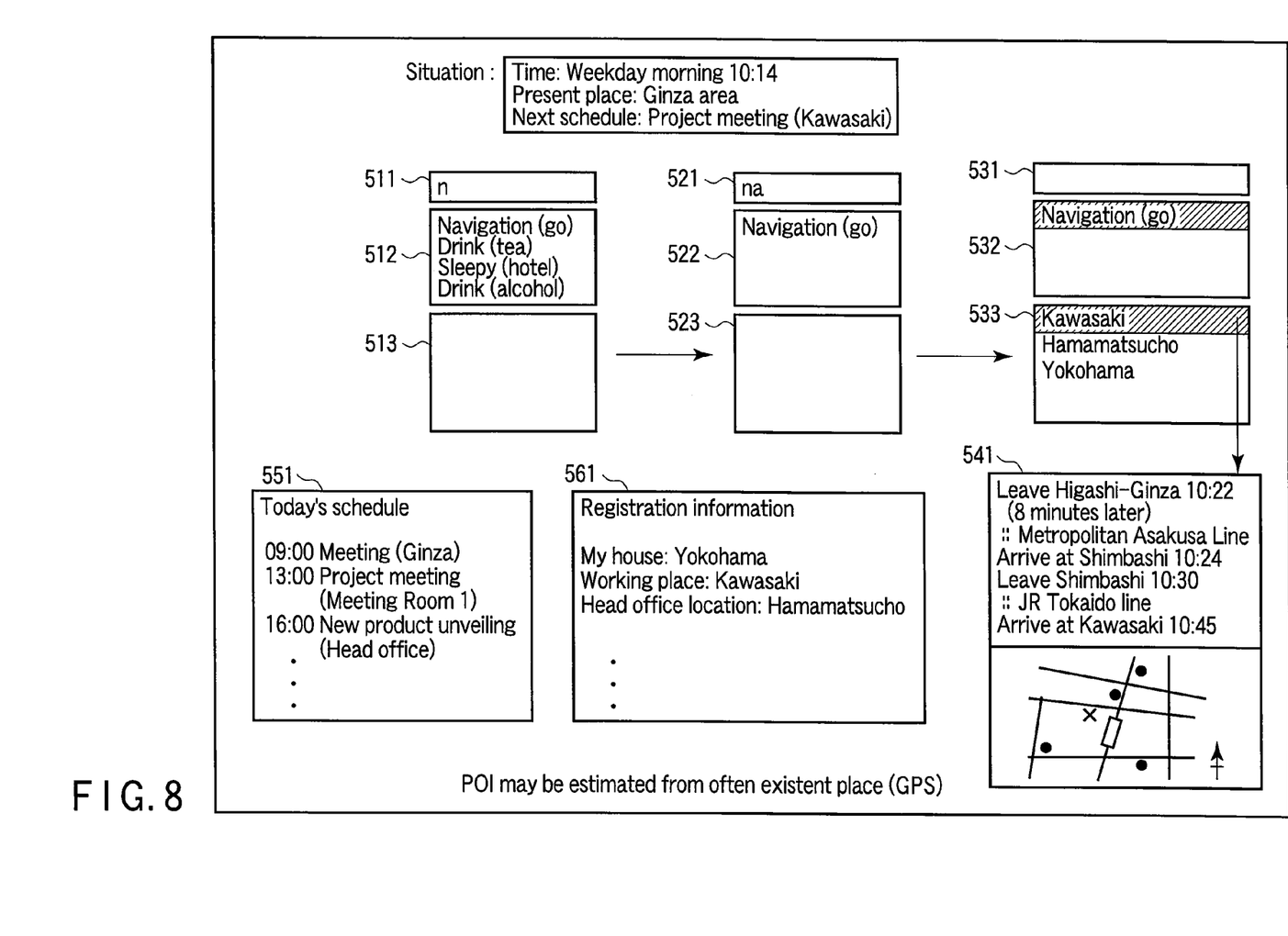
FIG. 8 is a diagram showing a case in which schedule information of a user is acquired as sensor data.

As explained above, the information indicating the situation in which the device is located are various. FIG. 8, for example, shows a case in which the sensor data acquisition unit 110 acquires user schedule information 551. In the situation recognition unit 120, assume that the situation "weekday morning (10:14), Ginza area, next scheduled to meet in Kawasaki" is obtained by reference to the registered information 561 including the working place, etc. of the user. In the case where "n" is input in the character input section 511 in this situation, such objects as the related words "sleepy (nemui)" and "drink (nomu)" not liable to be used during the working hours are removed from the candidates. Assuming that the "navigation (navi)" is selected as indicated by reference numeral 532 in FIG. 8, the object candidate liable to be visited as a destination can be presented by referring to the schedule of the day. Reference numeral 541 shows a case in which "Kawasaki (station)" is selected as the next schedule item and the navigation information for Kawasaki is displayed by internet search based on the present time and the present location.

Figure 9:
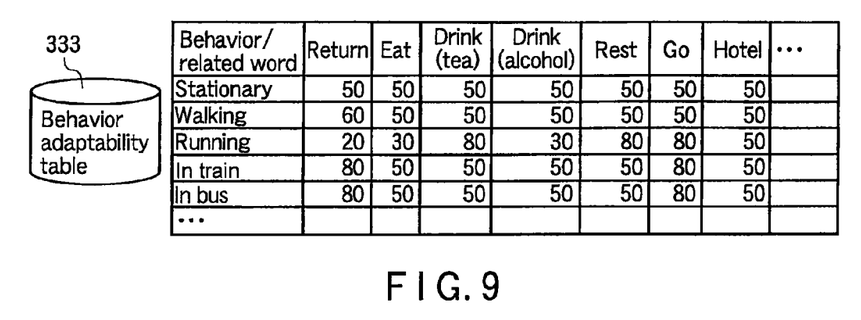
FIG. 9 is a diagram showing a behavior adaptability table.

Also, by acquiring the acceleration sensor information in the sensor data acquisition unit 110, the user behavior "run", for example, can be obtained in the situation recognition unit 120. The degree of adaptability obtained from the behavior adaptability table 333 shown in FIG. 9 is multiplied by the degree of adaptability in the situation adaptability table 330. In this way, the weight is adjusted in such a manner as to display, for example, "rest", "drink (tea)", etc. in high order immediately after the running.

As described above, with regard to the character string input by the user into the information device, the character strings (related words) associated with the neighboring object information available for use in the situation with the information device located therein are presented as character string candidates put in order of the degree of analogy between the adaptability to the particular situation and the character string input by the user. Further, the candidate of the object information corresponding to the character string (related word) selected by the user is displayed. As a result, the user can make access using a smaller amount of operation and an intuitive word even without the knowledge of the character string of specific object information.

(Collaboration Between Information Device and Information Providing Server)

Figure 10:
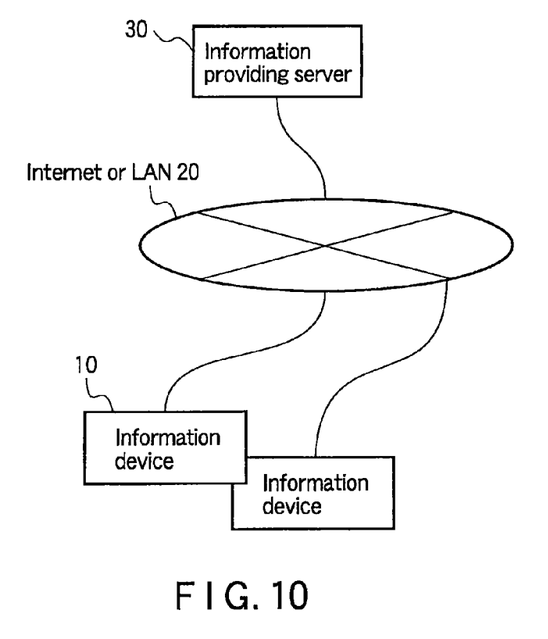
FIG. 10 is a diagram showing a configuration of collaboration between the information device and the information providing server.

As shown in FIG. 10, a configuration may be conceived in which the information device 10 collaborates with the information providing server 30 connectable therewith on the network 20. In this configuration example, the neighboring object information acquisition unit 130 is arranged on the information providing server 30 but not on the body of the information device 10. The neighboring object information 310 described above is also arranged on the information providing server 30. The situation information of the information device 10 obtained by the situation recognition unit 120 is transmitted by the information device 10 to the information providing server 30 through the communication processing unit 16 and the antenna 15 shown in FIG. 1. The information providing server 30, in response, transmits the neighboring object information in this situation and the corresponding related word information to the information device 10.

Figure 3:
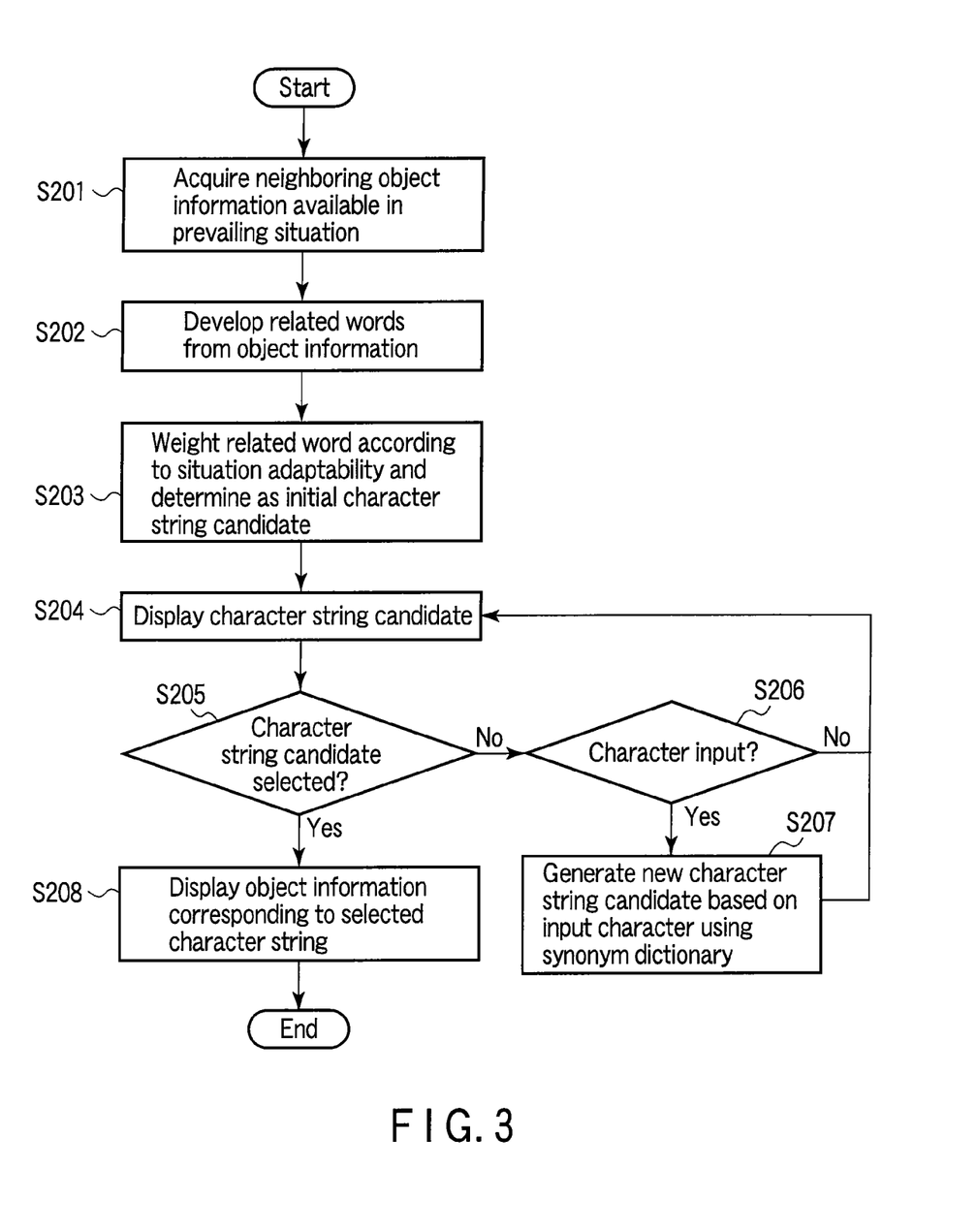
FIG. 3 is a flowchart for explaining the steps of a process executed by the information device.
Figure 11A:
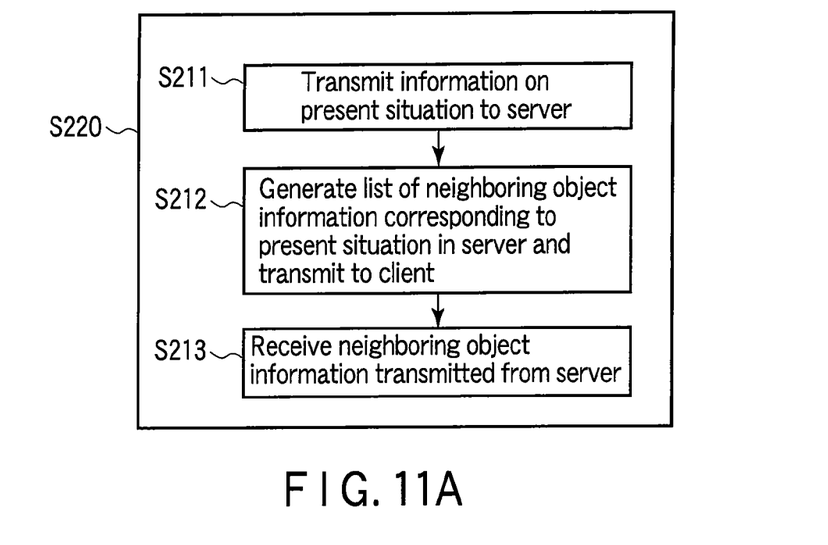

In this case, the neighboring object information is acquired not in step S201 of FIG. 3 but in step S220 of FIG. 11A. The information device 10 acquires the neighboring object information through the information providing server 30.

First, in step S211, the information on the current situation is transmitted to the information providing server 30. In the next step S212, the list of the neighboring object information corresponding to the current situation received from the information device 10 as a client is generated by the information providing server 30 and transmitted to the information device 10. In step S213, the neighboring object information transmitted from the information providing server 30 is received by the information device 10. After that, the process of and subsequent to step S202 shown in FIG. 3 is executed. Incidentally, the related words as well as the neighboring object information may be provided by the information providing server 30.

Figure 11B:
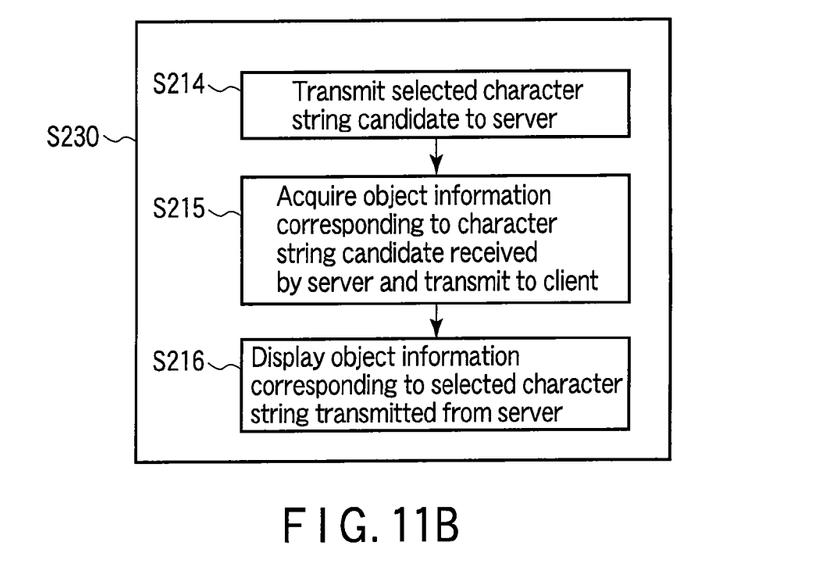

Acquisition of the object information corresponding to step S208 of FIG. 3 may be replaced by step S230 shown in FIG. 11B. The information for identifying several neighboring object information connected to the related words corresponding to the character string candidate selected by the information device 10 is acquired through the information providing server 30.

First, in step S214, the character string candidate selected by the information device 10 is transmitted to the information providing server 30. Next, in step S215, the object information (the information for identifying the neighboring object information) corresponding to the character string candidate received from the information device 10 as a client is transmitted to the information device 10. Then, in step S216, the information device 10 displays the object information (the information for identifying the neighboring object information) transmitted from the information providing server 30.

(Another Example of Situation Adaptability Degree Calculation)

In calculating the degree of adaptability to the related word of the neighboring object information in the search unit 140, for example, the related word may be weighted using the information on the distance from the present position of the information device 10 to the object and the time zone usable for use of the object and the predicted time before the object becomes usable.

Specifically, the neighboring object information is limited to those within the radius of 1 km from the present position and further the information on the closing and opening time for shops or facilities, for example, are added to the attribute information as the neighboring object. In this way, the character string more adapted for the situation can be selected as a candidate.

Figure 12:
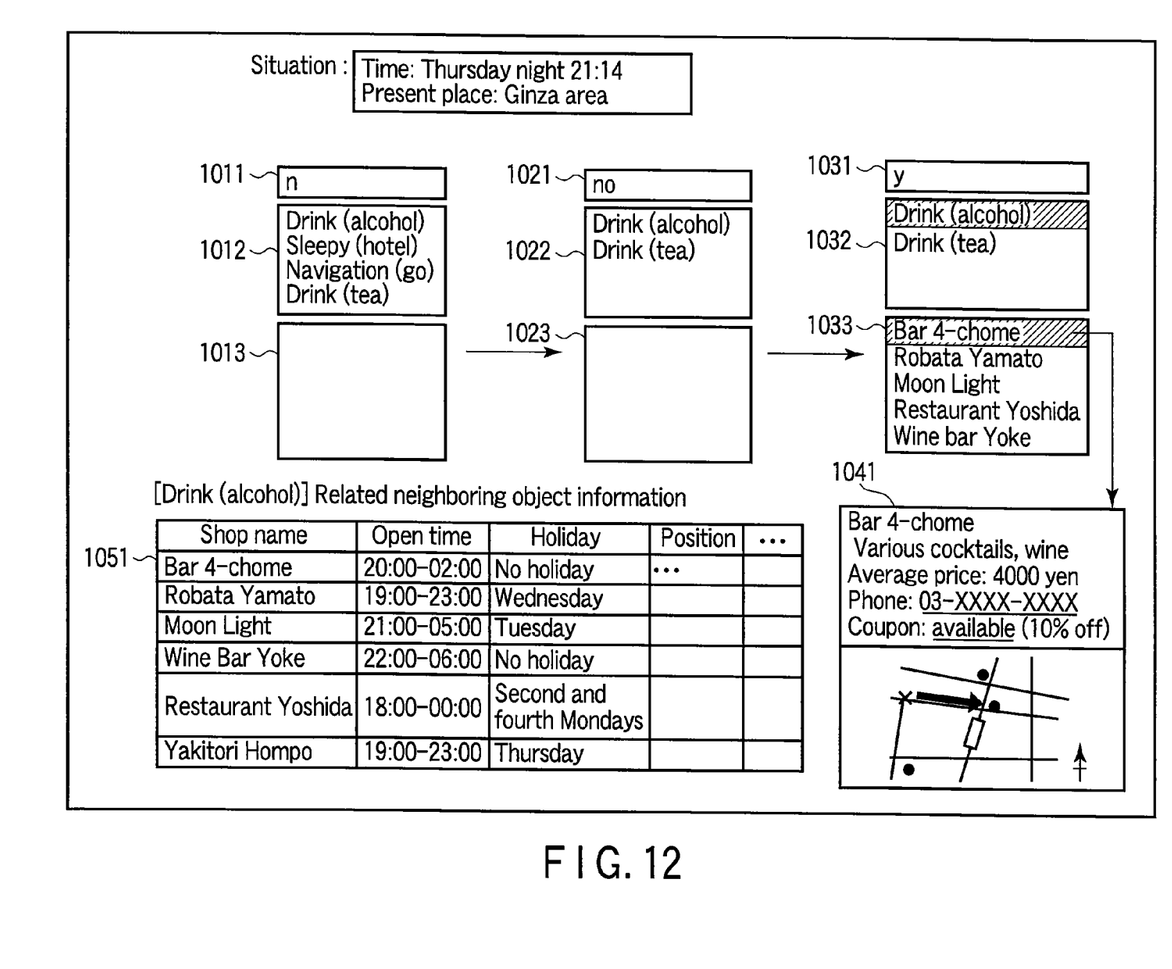
FIG. 12 is a diagram showing another example of situation adaptability calculation.

As designated by reference numeral 1011 in FIG. 12, for example, assume "n" is input in the character input section 401 at the Ginza area on Thursday night. As indicated by reference numeral 1012, the related word candidates for this date/hour and place are displayed in descending order of utility. In the process, the related words having no usable neighboring object are deleted from the candidates using the information such as the opening time of the neighboring objects.

As indicated by reference numeral 1012, for example, "drink (nomu) (tea)" matches the input "n" but is deleted from the candidates in the absence of a shop available in this time zone. As indicated by reference numeral 1032, on the other hand, assume that "drink (nomu) (alcohol)" is selected. Only an object usable in the prevailing situation is presented as a candidate by reference to the opening time or the holiday from the related neighboring objects 1051.

(Another Example of Generation of Character String Candidate)

In the case where the input character string is not more than a predetermined number in the character string candidate generating unit 160, the weight of the character string candidate is changed in accordance with the degree of abstractness of the particular character string. In this way, an abstract word is selected with a small number of inputs, while the name of the specific object information is desirably set at higher level of order for a greater number of inputs.

Figure 13:
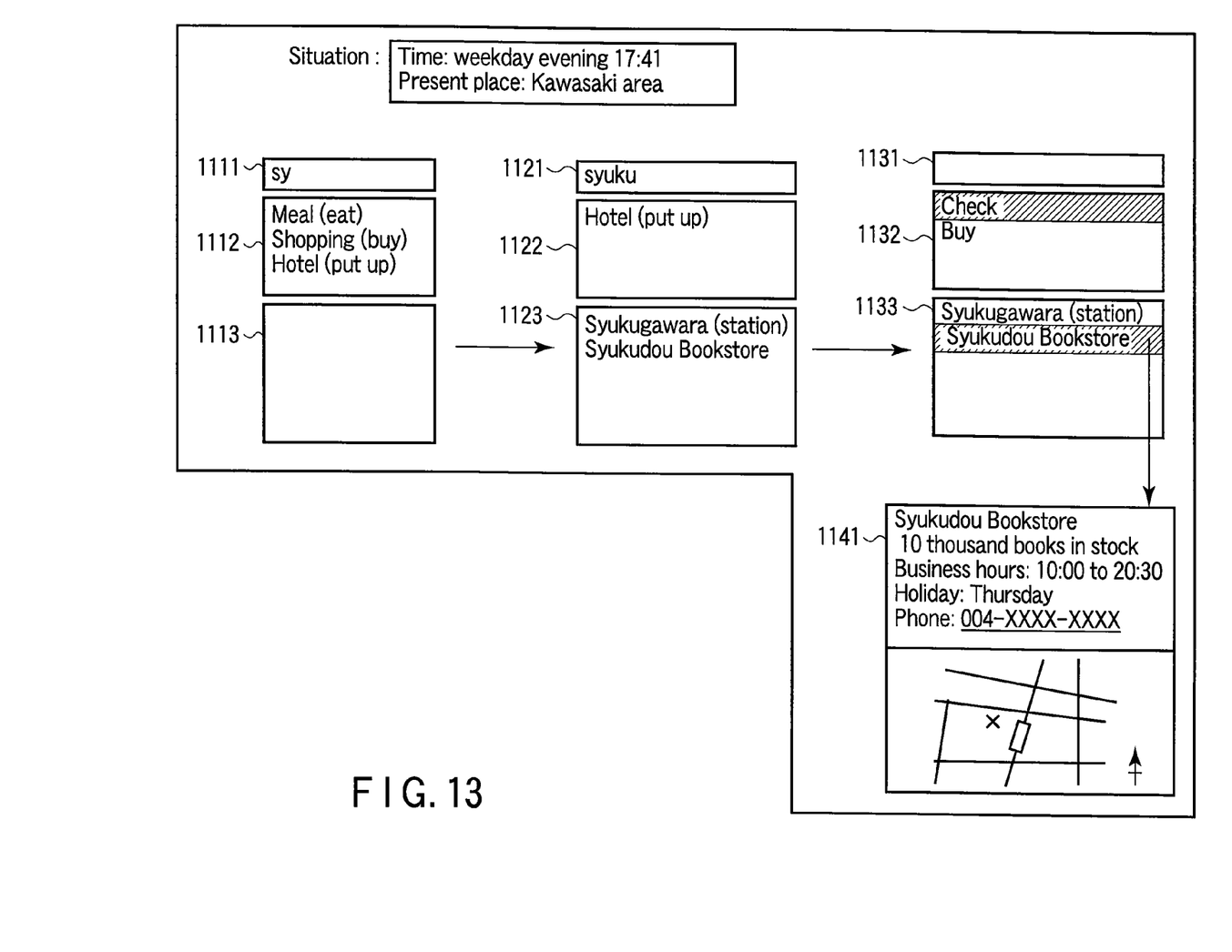
FIG. 13 is a diagram showing another example of character string candidate generation.

In the case where the predetermined length of a word is five characters, for example, as indicated by reference numeral 1111 in FIG. 13, assume that "sy" is input to the character input section 401. As indicated by reference numeral 1112, the abstract related words "meal (syokuji)", "shopping (syoppingu)" and "hotel (syukuhaku)" matching "sy" are displayed in descending order of usability. After that, upon further input of "syuku" indicated by reference numeral 1121, a predetermined length is reached. As indicated by reference numeral 1123, therefore, specific neighboring object information "syukugawara (station)" and "syukudou shoten (Syukudou Bookstore)" are also presented as candidates.

In the case where "(Syukudou Shoten) Syukudou Bookstore" is selected as indicated by reference numeral 1133, the related words such as "(siraberu) check" and "(kau) buy" are displayed in the character string candidate display section 402 as indicated by reference numeral 1132 by reference to the object type related word DB 320 based on the type information registered as the object information 310. Reference numeral 1141 indicates a case in which "(siraberu) check" is selected and the detailed information on the shop is displayed by searching the internet. In the case under consideration, the predetermined length is fixed at five characters. This length, however, may be changed with the presence or absence or the number of the related words matching the input.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information device comprising:
    a first acquisition unit which acquires situation data via a situation sensor, the situation data indicating situation and environmental information to which the information device is exposed;
    a second acquisition unit which acquires object information in accordance with the situation data;
    a search unit which searches a database for related words related to the object information;
    a situation adaptability table having a degree of adaptability between the related words and the situation data, wherein the search unit weights the related words in accordance with the degree of adaptability;
    a behavior adaptability table having values, relating to specific actions, to be multiplied by the degree of adaptability to adjust the weights of the related words;
    a first display unit which displays the related words in order of weights that have been adjusted to allow any one of the related words to be selected;
    a determining unit which determines whether any one of the related words is selected; and
    a second display unit which displays the object information acquired by the second acquisition unit for the selected one of the related words which is determined by the determining unit.

2. The device according to claim 1, wherein the search unit weights the related words in accordance with selected one of a distance to the object information, a time zone when the object is available for use and a predicted time before the object becomes available for use.

3. The device according to claim 1, further comprising:
    an input unit which inputs selected one of a character and a character string; and
    a generating unit which generates a plurality of related words analogous in reading to selected one of the character and the character string with reference to a synonym dictionary which stores a plurality of synonyms for the related words,
    wherein the first display unit displays the related words analogous in reading to selected one of the character and the character string.

4. The device according to claim 3, wherein the generating unit generates the plurality of related words in such a manner that the number of related words is increased for a length of the character string not more than a predetermined number, and the number of related words is reduced for the length of the character string exceeding the predetermined number.

5. The device according to claim 1, wherein the second acquisition unit transmits the situation data to a server and acquires a plurality of object information from the server in accordance with the situation data.

6. The device according to claim 1, wherein the second display unit transmits the selected one of the related words to the server and acquires the object information on the related word from the server.

7. The device according to claim 1, further comprising a second storage unit which stores a plurality of object information,
    wherein the second acquisition unit acquires the object information from the second storage unit in accordance with the situation data.

8. An information presentation method, comprising:
acquiring, through a first acquisition unit, situation data indicating situation and environmental information to which an information device is exposed;
acquiring object information corresponding to the situation data through a second acquisition unit;
searching by a search unit a database for related words related to the object information;
weighting the related words, through the search unit, in accordance with a degree of adaptability by referring to a situation adaptability table having a degree of adaptability between the related words and the situation data;
multiplying the degree of adaptability by values in a behavior adaptability table relating to specific actions, to adjust weights of the related words;
displaying the related words in order of weights that have been adjusted, through a first display unit, in such a manner that any one of the related words can be selected;
determining, through a determining unit, whether any one of the related words is selected; and
displaying, through a second display unit, the object information related to the any one of the related words determined by the determining unit to have been selected.

9. The method according to claim 8, wherein the step of weighting the related words comprises weighting the related words, through the search unit, in accordance with selected one of a distance to the object information, a time zone in which the object is available for use and a predicted time before the object becomes available for use.

10. The method according to claim 8, further comprising:
inputting selected one of a character and a character string through an input unit;
generating, through a generating unit, a plurality of related words analogous in reading to the selected one of the character and the character string, respectively, by referring to a synonym dictionary which stores a plurality of synonyms of the related words; and
displaying the related words analogous in reading to the selected one of the character and the character string on the first display unit.

11. The method according to claim 10, further comprising:
generating a plurality of related words, through the generating unit, in such a manner that the number of related words is increased in the case where a length of the character string is not larger than a predetermined number and the number of related words is decreased in the case where the length of the character string is larger than the predetermined number.

12. The method according to claim 8, further comprising:
transmitting the situation data from the second acquisition unit to a server and acquiring, through the second acquisition unit, a plurality of object information from the server in accordance with the situation data.

13. The method according to claim 8, further comprising:
transmitting the selected one of the related words to the server from the second display unit and acquiring, through the second display unit, a plurality of object information for the related words from the server.

14. The method according to claim 8, further comprising:
acquiring a plurality of object information, through the second acquisition unit, from a second storage unit in accordance with the situation data, the object information being stored in the second storage unit.

* * * * *